(12) United States Patent
Ohtsu

(10) Patent No.: US 7,738,214 B2
(45) Date of Patent: Jun. 15, 2010

(54) THIN FILM MAGNETIC HEAD

(75) Inventor: Takayoshi Ohtsu, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 727 days.

(21) Appl. No.: 11/787,098

(22) Filed: Apr. 12, 2007

(65) Prior Publication Data

US 2007/0258171 A1 Nov. 8, 2007

(30) Foreign Application Priority Data

Apr. 12, 2006 (JP) ............................ 2006-109703

(51) Int. Cl.
*G11B 5/31* (2006.01)
*G11B 5/60* (2006.01)
*G11B 21/21* (2006.01)

(52) U.S. Cl. .................. 360/234.5; 360/128; 360/294.7

(58) Field of Classification Search ............ 360/123.36, 360/123.57, 128, 234.4, 234.5, 294.7, 75
See application file for complete search history.

(56) References Cited

U.S. PATENT DOCUMENTS

| 7,088,543 | B2 | 8/2006 | Satoh et al. | |
| 7,375,913 | B2* | 5/2008 | Satoh et al. | 360/75 |
| 7,589,936 | B1* | 9/2009 | McFadyen et al. | 360/123.1 |
| 2006/0171076 | A1* | 8/2006 | Lille | 360/234.5 |
| 2008/0014467 | A1* | 1/2008 | Ohtsu et al. | 428/811.4 |
| 2008/0080096 | A1* | 4/2008 | Miura | 360/245.8 |
| 2008/0266716 | A1* | 10/2008 | Kato | 360/236.5 |
| 2009/0290259 | A1* | 11/2009 | Lee et al. | 360/234.5 |

FOREIGN PATENT DOCUMENTS

| JP | 2004-192742 | | 7/2004 |
| JP | 2004-342151 | | 12/2004 |
| JP | 2005063523 | A * | 3/2005 |
| JP | 2005135501 | A * | 5/2005 |
| JP | 2006040447 | A * | 2/2006 |

* cited by examiner

*Primary Examiner*—William J Klimowicz
(74) *Attorney, Agent, or Firm*—Townsend and Townsend and Crew LLP; Rambod Nader

(57) ABSTRACT

When exogenous noise is applied to the ground wire of a thin film magnetic head, crosstalk noise occurs in a lead line and a ground lines located near the ground wire. Embodiments in accordance with the present invention avoid this by providing a common terminal near the central portion of a thin film head portion. Write element terminals are connected to lines extending from a coil. Read element terminals are connected to lead wires extending from electrodes of a GMR element. A heater terminal is connected to a line extending from a heater. The common terminal is connected to a ground line of upper and lower shields via a resistor, to ground lines of electrodes via other resistors and to a ground line of upper and lower magnetic pole pieces of a write element via another resistor. A ground line of a slider, a ground line of the heater, and a ground line of the common terminal are all connected to a ground terminal.

10 Claims, 6 Drawing Sheets

THIN FILM MAGNETIC HEAD

CROSS-REFERENCE TO RELATED APPLICATION

The instant nonprovisional patent application claims priority to Japanese Application No. 2006-109703, filed Apr. 12, 2006 and incorporated by reference in its entirety herein for all purposes.

BACKGROUND OF THE INVENTION

A magnetic disk drive includes a rotating magnetic disk and a thin film magnetic head supported by a suspension and positioned in a radial direction of the magnetic disk. The magnetic head reads and writes magnetic data from and to the magnetic disk while relatively traveling over the magnetic disk. The slider of the magnetic head is designed to fly through the assistance of an air lubrication bearing, that is, an air wedge film effect, so that the slider does not come into direct contact with the magnetic disk. In order to realize higher recording density of a magnetic disk drive, and thereby increased capacity and reduced size thereof, it is effective to increase line recording density by reducing a distance between the slider and the magnetic disk, namely, the flying height of the slider.

The conventional design of flying height of a slide has allowed for a decrease in flying height resulting from machining variations, a temperature difference of usage environment, a difference in flying height between read and write and the like and has been provided with a flying height margin in order to prevent contact between the slider and the disk even under the worst conditions. If a slider is used having a capability of adjusting a flying height according to the use conditions for each thin magnetic head, it is possible to eliminate the margin mentioned above and thereby significantly reduce a flying height of a read/write element while preventing the contact between the slider and the disk. Japanese Laid-Open Patent No. 2004-342151 ("Patent Document 1") proposes a slider structure in which a heater made of a thin film resistive element is provided in the vicinity of a write element and a read element, heats part of the slider as necessary to thermally expand for protrusion, thus adjusting a distance between the write element and the read element, and a magnetic recording medium.

However, if the heater is provided to adjust flying height, then the number of lines in the read and write elements and the number of terminals disposed on the rear end face of the head will be increased. Also the number of lines on the suspension connected to the terminals is increased, thus narrowing each spacing between the lines. This poses a problem of crosstalk from the write element lines to the read element lines during writing. In order to solve the problem of crosstalk, Japanese Laid-Open Patent No. 2004-192742 ("Patent Document 2") discloses structures in which read element lines are disposed to be put between heater lines on a suspension and in which heater lines are disposed between write element lines and read element lines on the suspension.

A thin film magnetic head is provided on its rear end face with six terminals: two write element terminals, two read element terminals, a heater terminal and a ground terminal. The ground terminal is connected to a ground wire (or ground line) from a slider, ground lines of two electrodes of a read element, ground lines of upper and lower magnetic shields, ground lines of upper and lower magnetic pole pieces of a write element and a ground line of a heater. In this way, since the lines near the ground wire are crowded, if exogenous noise is applied to the ground wire of the slider, then crosstalk noise may occur in the lead wires of the read element, the ground lines of the electrodes, the ground lines of the upper and lower magnetic shields and the ground lines of the upper and lower magnetic pole pieces of the write element. The exogenous noise contains noise caused by a spindle motor for a magnetic disk and the like. Since the crosstalk noise has an adverse affect on the read element and the write element, it is necessary to reduce the crosstalk noise as much as possible.

BRIEF SUMMARY OF THE INVENTION

When exogenous noise is applied to the ground wire of a thin film magnetic head, crosstalk noise occurs in a lead line and at ground lines located near the ground wire. Accordingly, a particular embodiment of the present invention shown in FIG. 1 discloses a common terminal C provided near the central portion of a thin film head portion 1b. Write element terminals W are connected to lines LW extending from a coil 35. Read element terminals R−, R+ are connected to lead wires LE extending from electrodes of a GMR element 23G. A heater terminal H+ is connected to a line LH extending from a heater 4. The common terminal C is connected to a ground line LSA of upper and lower shields 21, 24 via a resistor R2, to ground lines LEA of electrodes via resistors R3, R4, and to a ground line LWA of upper and lower magnetic pole pieces 31, 33 of a write element via a resistor R5. A ground line LLA of a slider 1a, a ground line LHA of the heater 4 and a ground line LCA of the common terminal C are connected to a ground terminal G.

DETAILED DESCRIPTION OF THE INVENTION

Figure 1:
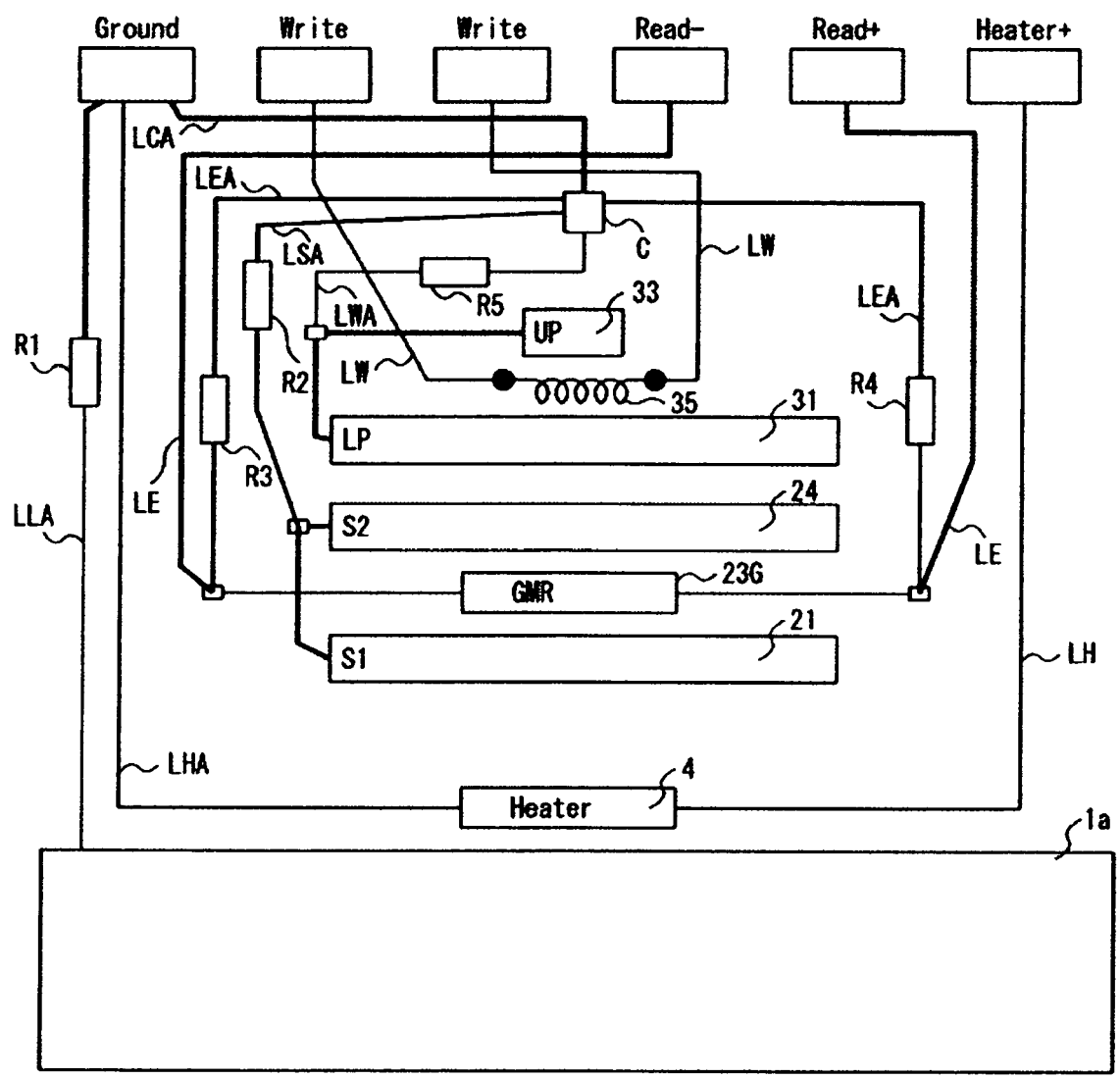
FIG. 1 is a schematic diagram illustrating the wiring structure of a thin film magnetic head (GMR) according to an embodiment of the present invention.

Embodiments in accordance with the present invention relate to a thin film magnetic head mounted on a magnetic disk drive, and particularly to a thin film magnetic head having a flying height adjusting capability.

It is an object of embodiments according to the present invention to reduce crosstalk between the ground wire of a thin film magnetic head and the lead wire of a read element.

A typical thin film magnetic head of the present invention includes: a thin film head portion formed on a trailing end face of a slider and having a heater, a read element, a write element, and a protection film covering the heater, the read element and the write element; a common terminal provided at a position near a track-widthwise central portion of the thin film head portion; read element terminals, write element terminals, a heater terminal and a ground terminal provided on an end face of the thin film head portion, the heater terminal and the ground terminal being provided on both sides of the read element terminals and the write element terminals; wherein a ground line of the read element and a ground line of the write element are connected to the common terminal, and a ground line of the common terminal, a ground line of the slider and a ground line of the heater are connected to the ground terminal.

According to embodiments of the present invention, crosstalk between the ground line or ground wire of the thin film magnetic head and the lead wire of the read element, and crosstalk between the ground wire of the thin film magnetic head and the ground lines of the read and write elements, can be reduced.

Preferred embodiments of the present invention will be hereunder described with reference to the drawings. Note that like reference numerals denote like or corresponding elements in all the drawings and duplicated explanation is omitted for the sake of clarification.

Figure 3:
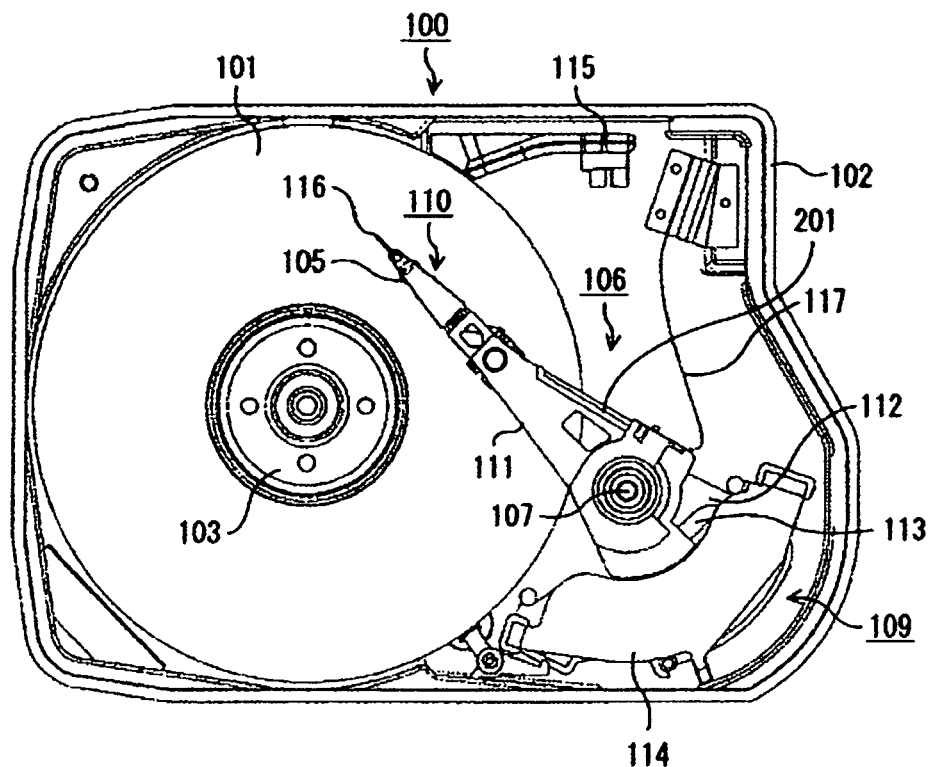
FIG. 3 is a plan view of a hard disk drive on which a thin film magnetic head is mounted.

The entire construction of a hard disk drive (HDD) will first be described to facilitate understanding of embodiments in accordance with the present invention. FIG. 3 is a schematic plan view illustrating the configuration of the HDD. The HDD 100 includes a magnetic disk as a recording medium adapted to record data therein. The magnetic disk 101 is a nonvolatile memory which stores date therein by magnetizing a magnetic layer. The constituent elements of the HDD 100 are accommodated in a base 102. The base 102 is fixed via a gasket (not shown) to a cover (not shown) closing the upper opening of the base 102 to constitute a disk enclosure, in which all the constituent elements are housed sealingly.

The magnetic disk 101 is fixed to a spindle motor 103. The thin film magnetic head 105 has a head element portion adapted to read and/or write data from and/or to the magnetic disk 101, the data being input/output to/from a host (not shown). The head element portion includes a write element and/or a read element and a slider having the write element and/or the read element formed on the surface thereof. The write element converts an electric signal to a magnetic field in accordance with data written to the magnetic disk. The read element converts an electric field from the magnetic field to an electric signal.

The actuator 106 holds and moves the thin film magnetic head 105. The actuator 106 is pivotally held by a pivot shaft 107 and driven by a voice coil motor (VCM) as a driving mechanism. The actuator 106 includes constituent members such as a suspension 110, an arm 111, a coil support 112 and a flat coil 113, which are connected in this order from the longitudinal leading end having the magnetic head 105 disposed thereon. Note that the configuration of the suspension 110 will be detailed later. The VCM 109 is composed of the flat coil 113, a stator magnet (not shown) fixed to an upper magnetic holding plate 114, and a stator magnet (not shown) fixed to a lower stator magnetic holding plate.

The magnetic disk 101 is held in an integrated manner by the spindle motor 103 fixed to the bottom surface of the base 102 and rotationally driven by the spindle motor 103 at a desired speed. The magnetic disk 101 is rotated counterclockwise in FIG. 3. When the HDD is inoperative, the magnetic disk 101 stands still. The VCM 109 permits the actuator 106 to pivot about the pivot shaft 107 transversely in response to a driving signal coming from a controller (not shown) to the flat coil 113. Thus, the actuator 106 can move the magnetic head 105 above or outside the magnetic disk 101.

In order to read/write data from/to the magnetic disk 101, the actuator 106 moves the magnetic head 105 to above the data area on the surface of the rotating magnetic disk 101. The pivotal movement of the actuator 106 moves the magnetic head 105 along the radial surface of the magnetic disk 101. Thus, the magnetic head 105 can access a desired track. A signal between the magnetic head 105 and controller is transmitted by a trace 201 or a transmitting line and a FPC 117. The magnetic head 105 flies above the magnetic disk 101 at a fixed gap therebetween when equilibrium is established between the pressure resulting from viscosity of air between the ABS (air bearing surface) of the slider facing the magnetic disk 101 and the rotating magnetic disk 101, and the pressure of the suspension 110 applied toward the magnetic disk 101.

When the magnetic disk 101 stops rotating, the magnetic head 105 will come into contact with the surface of the magnetic disk 101. This may produce a problem in that an absorbing phenomenon causes a scratch or flaw on the data area of the magnetic disk 101 or causes the magnetic disk to be unable to rotate. To prevent such a problem, the actuator 106 allows the magnetic head 105 to withdraw from the data area onto a ramp mechanism 115 when the rotation of the magnetic disk 101 stops. The actuator 106 is turned toward the ramp mechanism 115, and a tab 116 formed at the tip of the actuator slidingly moves on the surface of the ramp mechanism 115 and then rests on the parking surface of the ramp mechanism 115. Thus, the magnetic head 105 is unloaded. When the magnetic head 105 is loaded, the tab 116 having rested on the parking surface leaves the ramp mechanism 115 and then the magnetic head 105 moves to above the surface of the magnetic disk 101.

While adopting the load and unload system, the HDD described above may adopt the CSS (contact start and stop) system. In the CSS system, while the magnetic head 105 does not perform a data read/write process, it withdraws in a zone arranged in the inner circumference of the magnetic disk 101. In the above description, the HDD has the single magnetic disk 101 having one recording surface for the sake of simplicity. However, the HDD may be provided with a single or a plurality of recording magnetic disks each having two recording surfaces.

Figure 4:
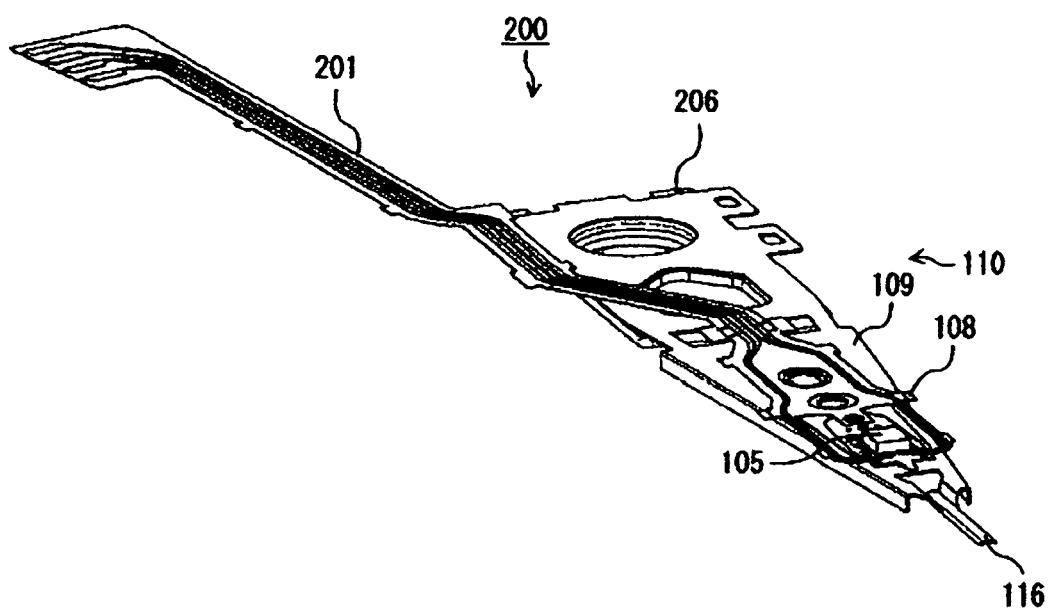
FIG. 4 is a perspective view of a head gimbal assembly incorporating the thin film magnetic head according to embodiments of the present invention.

Next, a description is made of the configuration of a head gimbal assembly (HGA) with the thin film magnetic head 105 attached to the suspension 110 with reference to FIG. 4. FIG. 4 illustrates the structure of the HGA as viewed from the recording surface of the magnetic disk. As shown in FIG. 4, the HGA 200 includes the magnetic head 105, the suspension 110 and the trace 201 or a transmitting line. The suspension 110 includes flexible gimbal 108, a load beam 109 and a mount plate 206. The gimbal 108 holds the magnetic head 105 on a side facing the magnetic disk. The load beam holds the gimbal 108 on the side facing the magnetic disk. The HGA 200 in FIG. 4 is of the load and unload type and has the tab 116 located at the leading end of the load beam 109 for withdrawal onto the ramp mechanism. The magnetic head 105 is formed at its trailing end face (the tab side) with a plurality of terminals connected to the head element portion. The terminals are each connected to a corresponding one of the lines of the trace 201 using soldering, gold ball bonding or the like.

Figure 5:
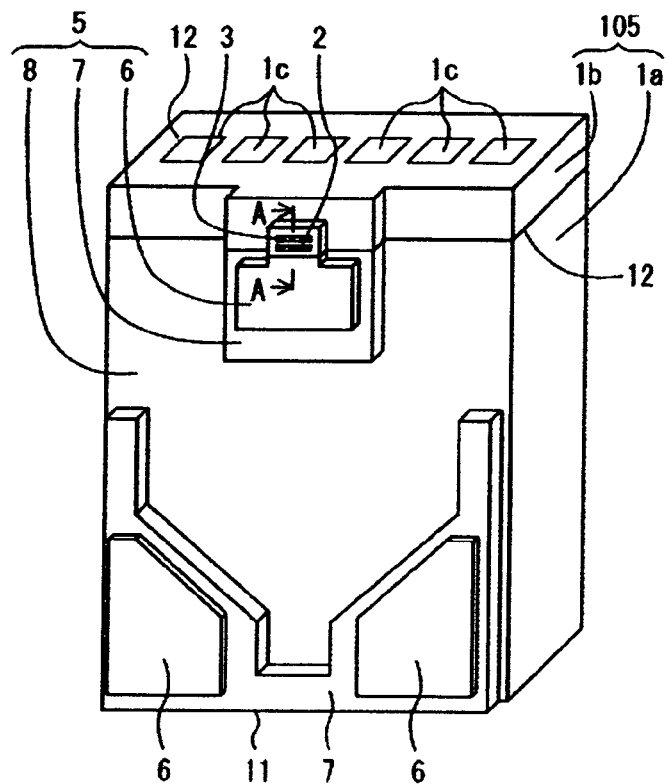
FIG. 5 is an external view of a thin film magnetic head according to an embodiment of the present invention.

A description is next made of a configuration of the thin film magnetic head 105 according to an embodiment of the present invention with reference to FIG. 5. The magnetic head 105 is composed of a substrate (slider) 1a and a thin film head portion 1b. The slider 1a is of an approximately rectangular parallelepiped and is composed of an air bearing surface 5, a leading end face 11, a trailing end face 12, both lateral surfaces and back surfaces, namely, six surfaces in total. For instance, the magnetic head 105 measures 1.25 mm in length, 1.0 mm in width, and 0.3 mm in thickness. The thin film head portion 1b is formed with a plurality of terminals 1c at its end face 13. The air bearing surface 5 has fine steps (step bearings) formed by ion milling so as to serve as an air bearing which faces the magnetic disk to generate air pressure therebetween, thereby carrying a load applied to the back of the air bearing surface.

The steps of the air bearing surface is classified into three kinds of surfaces parallel substantially to each other: rail surfaces 6 nearest to the disk; lower rail surfaces 7 or step bearing surfaces lower than the rail surfaces 6 by about 100 to 200 nm; a lowest surface 8 lower than the rail surfaces 6 by about 1 µm. When entering the rail surfaces 6 from the lower rail surfaces 7 or the step bearing (surface), an air stream caused by the rotation of the disk is compressed by a tapered passage with its edge narrowed to produce a positive air pressure. On the other hand, when the air stream enters the lowest surface 8 from the rail surfaces 6 and lower rail surfaces 7, a negative air pressure is produced by the expanded passage.

The thin film magnetic head 105 is designed to fly such that the flying height of a leading end side is greater than that of a trailing end side. Thus, the rail surface 6 near the end face 13 comes closest to the disk. Near the end face 13 the rail surface 6 projects relative to the lower rail surface 7 and the lowest surface 8 surrounding the rail surface 13. Therefore, unless the pitch and roll attitudes of the slider incline in excess of a certain limit, the rail surface 6 will come closest to the disk. The read element 2 and the write element 3 are formed on a portion of the rail surface 6 belonging to the thin film head portion 1b. The shape of the step bearing are designed so that a load applied from the load beam 109 may balance with positive and negative air pressures produced on the air bearing surface 5, whereby a distance between the write element 3 and the read element 2 and the disk can be maintained at an appropriate value equal to about 10 nm or less. Incidentally, the thin film magnetic head 105 described above has the two-step bearing slider in which the air bearing surface 5 is composed of the three kinds of surfaces. However, the head 105 is not limited to this configuration and it may have a three-step slider in which the air bearing surface 5 is composed of four or more kinds of parallel surfaces.

Figure 6:
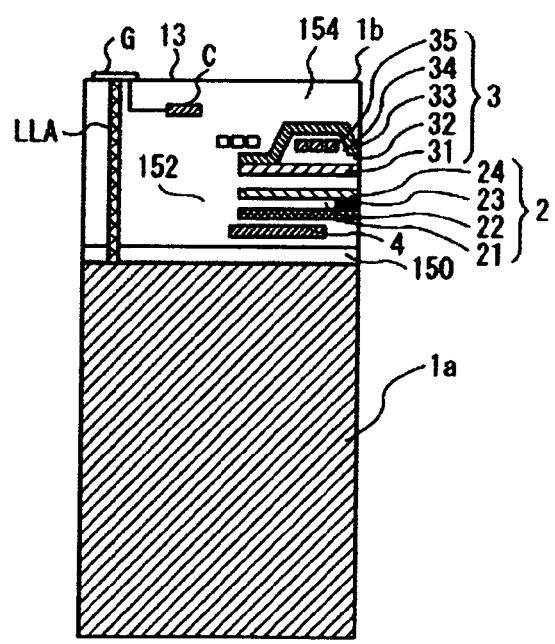
FIG. 6 is a cross-sectional view taken along line A-A of FIG. 5, illustrating the configuration of a thin film head portion.

Next, a description is made of the internal configuration of the thin film head portion 1b formed on the slider 1a with reference to FIG. 6 or a cross-sectional view taken along line A-A of FIG. 5. The thin film head portion 1b includes an alumina insulating film 150, a heater 4, the read element 2 and the write element 3 laminated in this order from the side of the slider 1a, insulating films (alumina) 152 isolating the constituent elements above from each other, and a protection film (alumina) 154 covering the whole mentioned above. The heater 4 is a thin film resistive element made of NiCr or the like and is disposed below (near) the read element 2. The read element 2 includes a lower shield 21, a gap film 22, a magnetoresistive element 23 formed in the gap film 22 and an upper shield 24. The magnetoresistive element is a GMR (Giant Magnetoresistive) element, a TMR (Tunneling Magnetoresistive) element or the like. The write element 3 includes a lower magnetic pole piece 31, an upper magnetic pole piece 33, and a coil 35. The upper magnetic pole piece 33 has a magnetic gap 32 formed on the air bearing surface side and is magnetically connected to the lower magnetic pole piece 31 at the rear portion thereof. The coil 35 is formed between the lower magnetic pole piece 31 and the upper magnetic pole piece 33 via an interlayer insulating film 34. In addition, the thin film head portion 1b is provided with a common terminal C described later.

The slider 1a is connected via a ground line (stud) LLA to a ground terminal G formed on the end face 13. The thin film magnetic head 105 of this type is called a TFC (thermal flying control) head. This magnetic head 105 can adjust a distance (flying height) between the read element 2 and write element 3 and the magnetic disk by the following way. An electrical current is applied to the heater 4 as necessary to heat and thermally expand the insulating film (alumina) 152 covering the read element 2 and write element 3, thereby causing the read element 2 and write element 3 to protrude toward the air bearing surface side. Incidentally, in the configuration described above, the heater 4 is disposed between the insulating film 150 and the read element 2. However, embodiments in accordance with the present invention are not limited to this particular example. The heater 4 needs only to be located at a position near or rearward of the read element 2, or rearward of the read element 2 and write element 3.

Figure 7:
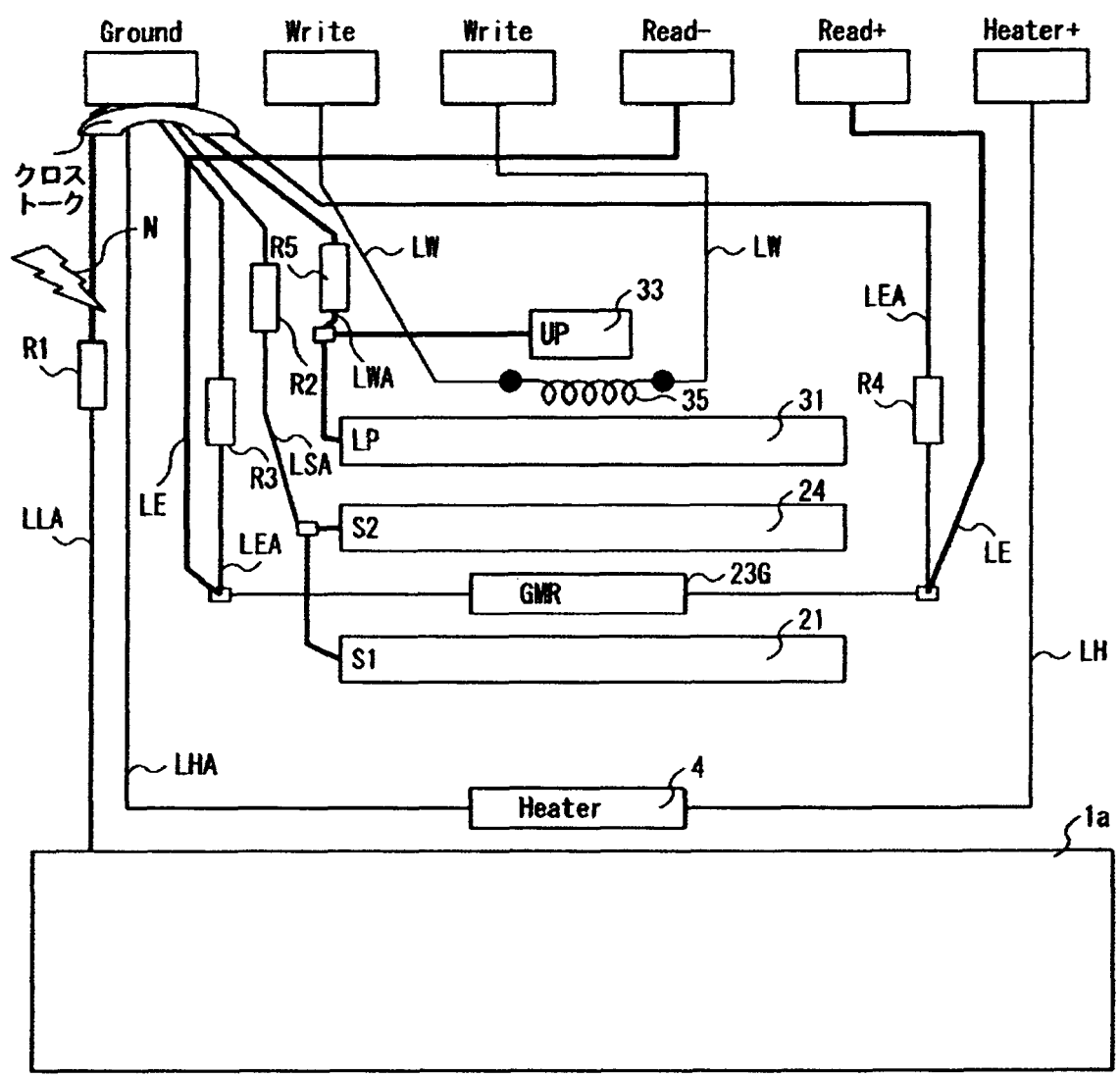
FIG. 7 is a schematic diagram illustrating the wiring structure of a thin film magnetic head (GMR) by way of comparative example.
Figure 8:
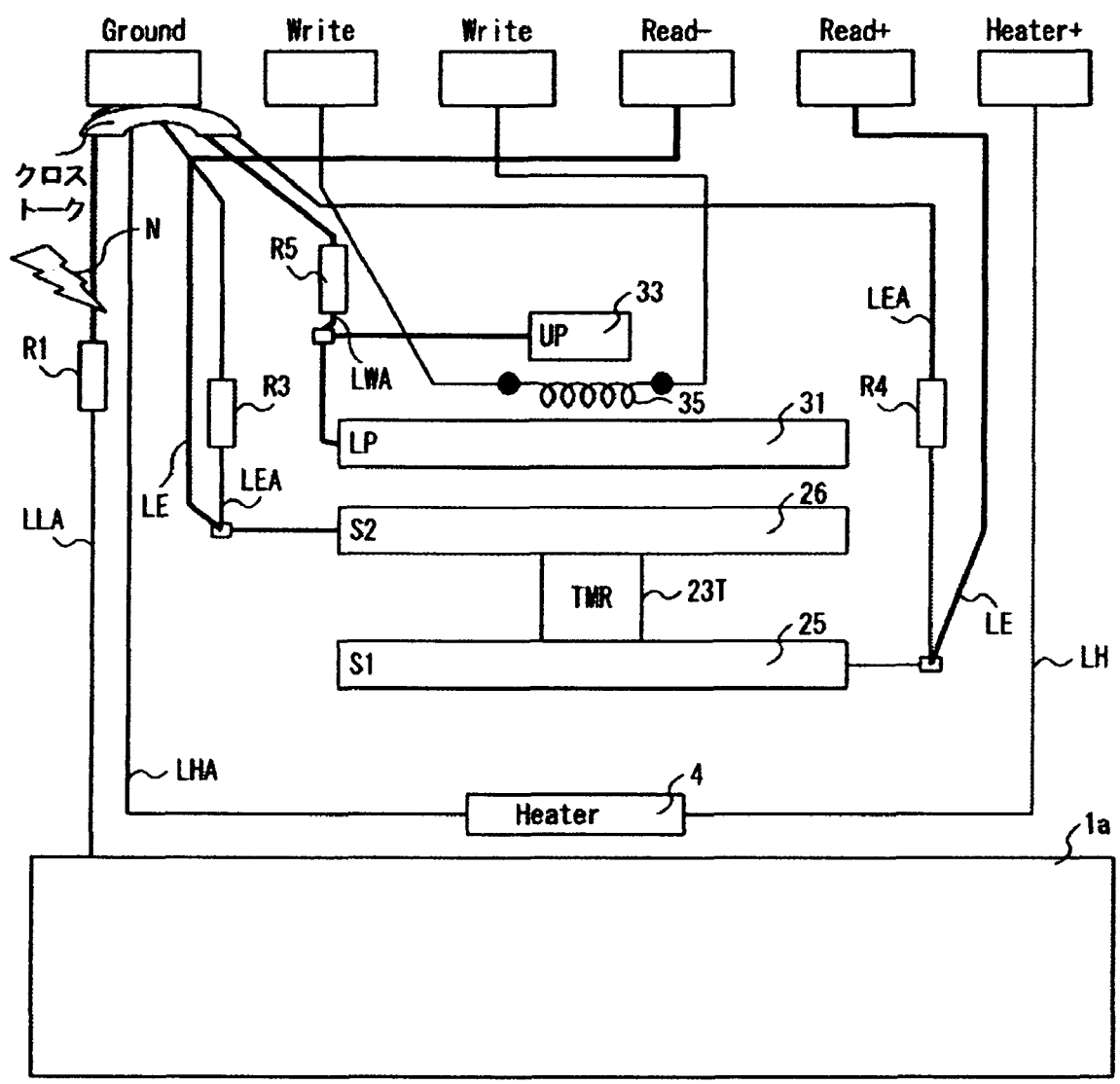
FIG. 8 is a schematic diagram illustrating the wiring structure of a thin film magnetic head (TMR) by way of comparative example.

Next, a description is made of the connective relationship between the lines and terminals 1c of the head element portion in the thin film magnetic head by way of comparative examples using a GMR element and a TMR element as the read element with reference to FIGS. 7 and 8, respectively. FIG. 7 is a schematic diagram of the lines and terminals 1c of the head element portion in the thin film magnetic head using a GMR element 23G, as viewed from the air bearing surface. The terminals 1c are arranged in the following order from the left end of the thin film head portion 1b: the ground terminal G (Ground), a write element terminal W (Write), another write element terminal W (Write), a read element terminal R− (Read−), another read element terminal R+ (Read+), and a heater terminal H+ (Heater+). In FIG. 7, the two write element terminals W are respectively connected to lines LW extending from both the ends of the coil 35. The two read element terminals R− and R+ are respectively connected to lead wires LE extending from the electrodes of the GMR element 23G. The heater terminal H+ is connected to a heater line LH extending from the heater 4. A ground line LLA extending from the slider 1a is connected to the ground terminal G via a resistor R1. A ground line LHA of the heater 4 is connected to the ground terminal G. Ground lines LEA of the electrodes are connected to the ground terminal G via resistors R3 and R4. A ground line LSA of the upper and lower shields 21, 24 is connected to the ground terminal G via a resistor R2. A ground line LWA of the upper and lower electromagnetic pole pieces 31, 33 is connected to the ground terminal G via a resistor R5. If noise from the magnetic disk is applied to the ground line LLA via the slider 1a, since the shunt resistances of the left and right lead wires LE are different from each other, crosstalk noise occurs in the left lead wire LE and the ground lines LHA, LEA, LSA, LWA.

FIG. 8 is a schematic diagram of the lines and terminals 1c of the head element portion in the thin film magnetic head using a TMR element 23T, as viewed from the air bearing surface. The arrangement of the terminals 1c is the same as that of the example shown in FIG. 7. Since the TMR element 23T can use the upper and lower shields 26, 25 as electrodes, the ground line LSA of the upper and lower shields 21, 24 in FIG. 7 can be omitted. However, the other ground lines are the same as those in FIG. 7. If noise from the magnetic disk is applied to the ground line LLA via the slider 1a, since the shunt resistances of the left and right lead wires LE are different from each other, crosstalk noise occurs in the left lead wire LE and the ground lines LHA, LEA, LWA.

An object of embodiments of the present invention is to reduce the influence of the crosstalk described above. A description is made of the wiring structure of the thin film magnetic head of the embodiment of the present invention with reference to FIGS. 1 and 2. FIG. 1 is a schematic diagram of the lines and terminals 1c of the head element portion in the thin film magnetic head 105 using a GMR element 23G, as viewed from the air bearing surface. The arrangement of the terminals 1c is the same as that shown in FIG. 7. That is, the terminals 1c are arranged in the following order from the left end of the thin film head portion 1b: a ground terminal G (Ground), a write element terminal W (Write), another write element terminal W (Write), a read element terminal R− (Read−), another read element terminal R+ (Read+), and a heater terminal H+ (Heater+). Needless to say, the ground terminal G and the heater terminal H+ may be arranged reversely. In addition, the two write element terminals W and the two read element terminals R(−), R(+) may be arranged reversely.

In FIG. 1, the two write element terminals W are connected to lines LW extending from both ends of the coil 35. The two read element terminals R−, R+ are connected to respective lead wires LE extending from the electrodes of the GMR element 23G. The heater terminal H+ is connected to a heater line LH extending from the heater 4. The common terminal C is provided at a position near the track-widthwise central portion of the thin film head portion 1b. Ground lines LEA of the electrodes of the GMR element are respectively connected to the common terminal C via resistors R3 and R4. A ground line LSA of the upper and lower shields 21, 24 is connected to the common terminal C via a resistor R2. A ground line LWA of the upper and lower magnetic pole pieces 31, 33 is connected to the common terminal C via a resistor R5. A ground wire or a ground line LLA extending from the slider 1a via a resistor R1, a ground line LHA of the heater 4, and a ground line LCA of the common terminal C are connected to the ground terminal G. Such connection reduces a difference in shunt resistance between the left and right lead wires LE with respect to the common terminal C. Therefore, even if noise from the magnetic disk is applied to the ground line LLA via the slider 1a, crosstalk noise occurring in the left lead wire LE, the ground line LHA of the heater, and the ground line LCA of the common terminal can be reduced.

Incidentally, the common terminal C is provided at the upper central portion of the head element portion in the thin film head portion 1b in this embodiment. If the end face 13 of the thin film head portion 1b has a margin, however, the common terminal C may be disposed between the write element terminal W and the read element terminal R−.

Figure 2:
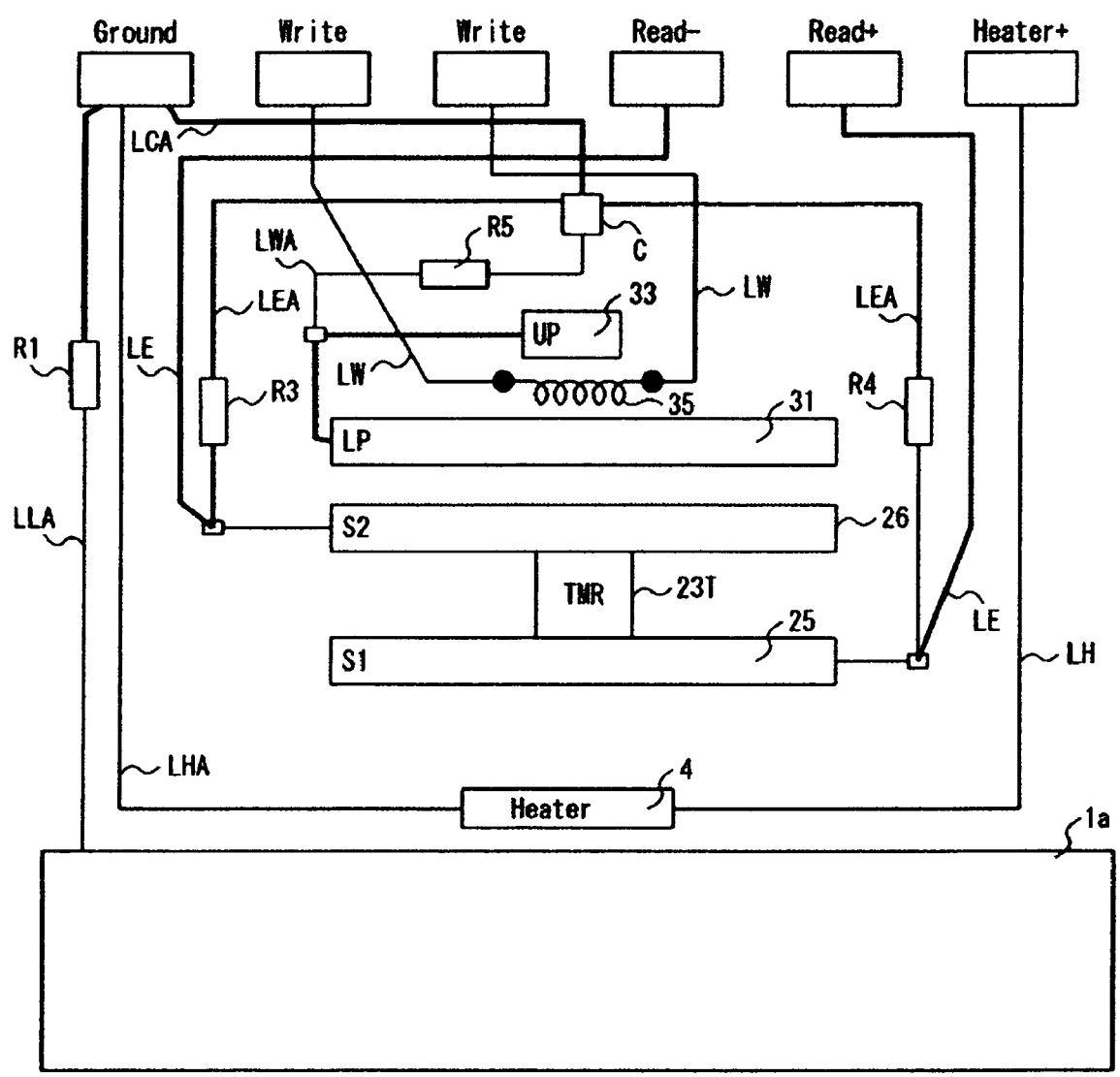
FIG. 2 is a schematic diagram illustrating the wiring structure of a thin film magnetic head (TMR) according to an embodiment of the present invention.

FIG. 2 is a schematic diagram of the lines and terminals 1c of the head element portion in the thin film magnetic head 105 using a TMR element 23T, as viewed from the air bearing surface. The arrangement of the terminals 1c is the same as that of the example described above with reference to FIG. 1. For the TMR element 23T, since the upper and lower shields 26, 25 can be used as electrodes, the ground line LSA of the upper and lower shields 26, 25 can be omitted. Two write element terminals W are respectively connected to lines LW extending from both ends of the coil 35. A read element terminal R− is connected to a lead wire LE extending from the upper shield and electrode 26 of the TMR element 23T. A read element terminal R+ is connected to a lead wire LE extending from the lower shield and electrode 25. A heater element terminal H+ is connected to a heater line LH extending from the heater 4. The common terminal C is provided at a position near the track-widthwise central portion of the thin film head portion 1b. A ground line LEA of the upper shield and electrode 26 of the TMR element 23 is connected to the common terminal C via a resistor R3. A ground line LEA of the lower shield and electrode 25 is connected to the common terminal C via a resistor R4. A ground line LWA of the upper and lower magnetic pole pieces 31, 33 is connected to the common terminal C via a resistor R5. A ground wire or a ground line LLA from the slider 1a (via a resistor R1), a ground line LHA of the heater 4 and a ground line LCA of the common terminal C are connected to the ground terminal G. Such connection reduces a difference in shunt resistance between the left and right lead wires LE with respect to the common terminal C. Therefore, even if noise from the magnetic disk is applied to the ground line LLA via the slider 1a, crosstalk noise occurring in the left lead wire LE, the ground line LHA of the heater, and the ground line LCA of the common terminal can be reduced.

Also in the embodiment using the TMR element described above, the common terminal C is provided at the upper central portion of the head element portion in the thin film head portion 1b. If the end face 13 of the thin film head portion 1b has a margin, however, the common terminal C may be disposed between the write element terminal W and the read element terminal R−.

As described above, according to the embodiments of the present invention described above, the thin film head portion is provided with the common terminal C, the ground line extending from each element is once connected to the common terminal C, and the ground line of the common terminal C is connected to the ground terminal G. Therefore, a difference in shunt resistance is reduced between the left and right lead wires. Thus, even if exogenous noise from the magnetic disk is applied to the ground wire or the ground line via the slider, crosstalk noise occurring in the lead wires close to the ground wire and each ground line connected to the ground terminal G can be reduced.

What is claimed is:

1. A thin film magnetic head comprising:
   a slider;
   a thin film head portion provided on a trailing end face of the slider and including a heater, a read element, a write element and a protection film covering the heater, the read element and the write element;
   a common terminal provided at a position near a track-widthwise central portion of the thin film head portion; and
   read element terminals, write element terminals, a heater terminal and a ground terminal provided on an end face of the thin film head portion, the heater terminal and the ground terminal being provided on both sides of the read element terminals and the write element terminals;
   wherein a ground line of the read element and a ground line of the write element are connected to the common terminal, and a ground line of the common terminal, a ground line of the slider and a ground line of the heater are connected to the ground terminal.

2. The thin film magnetic head according to claim 1, wherein the common terminal is provided between the read element terminal and the write element terminal on the end face of the thin film head portion.

3. The thin film magnetic head according to claim 1, wherein the heater is provided between the slider and the read element.

4. The thin film magnetic head according to claim 1, wherein the heater is provided rearward the read element.

5. A thin film magnetic head comprising:
   a slider including an air bearing surface, a leading end face and a trailing end face;

a thin film head portion provided on the trailing end face of the slider and including:
a heater;
a read element having a lower shield, an upper shield, and a GMR element sandwiched between the lower and upper shields:
a write element having a lower magnetic pole piece, an upper magnetic pole piece and a coil disposed between the lower and upper magnetic pole pieces; and
a protection film covering the heater, the read element, and the write element;
a common terminal provided at a position near a track-widthwise central portion of the thin film head portion; and
read element terminals, write element terminals, a heater terminal and a ground terminal provided on an end face of the thin film head portion, the heater terminal and the ground terminal being provided on both sides of the read element terminals and the write element terminals;
wherein a ground line connected to the upper and lower shields, a ground line connected to an electrode of the GMR element and a ground line connected to the lower and upper magnetic pole pieces are connected to the common terminal; and
a ground line of the common terminal, a ground line of the slider and a ground line of the heater are connected to the ground terminal.

6. The thin film magnetic head according to claim 5, wherein the common terminal is provided between the read element terminal and the write element terminal on the end face of the thin film head portion.

7. The thin film magnetic head according to claim 5, wherein the heater is provided near the read element.

8. A thin film magnetic head comprising:
a slider including an air bearing surface, a leading end face and a trailing end face;
a thin film head portion provided on the trailing end face of the slider and including:
a heater;
a read element having a lower shield and electrode, an upper shield and electrode and a TMR element sandwiched between the lower and upper shield and electrodes;
a write element having a lower magnetic pole piece, an upper magnetic pole piece and a coil disposed between the lower and upper magnetic pole pieces; and
a protection film covering the heater, the read element, and the write element;
a common terminal provided at a position near a track-widthwise central portion of the thin film head portion; and
read element terminals, write element terminals, a heater terminal and a ground terminal provided on the end face of the thin film head portion, the heater terminal and the ground terminal being provided on both sides of the read element terminals and the write element terminals;
wherein a ground line connected to the lower shield and electrode, a ground line connected to an upper shield and electrode and a ground line connected to the lower and upper magnetic pole pieces are connected to the common terminal; and
a ground line of the common terminal, a ground line of the slider and a ground line of the heater are connected to the ground terminal.

9. The thin film magnetic head according to claim 8, wherein the common terminal is provided between the read element terminal and the write element terminal on the end face of the thin film head portion.

10. The thin film magnetic head according to claim 8, wherein the heater is provided near the read element.

* * * * *